United States Patent
Soga

(10) Patent No.: US 9,588,724 B2
(45) Date of Patent: Mar. 7, 2017

(54) APPARATUS FOR PRINTING ON A SHEET AND CONVEYING THE PRINTED SHEET TO A READING UNIT TO READ, METHOD OF CONTROLLING THE SAME, AND STORAGE MEDIUM

(71) Applicant: CANON KABUSHIKI KAISHA, Tokyo (JP)

(72) Inventor: Masaya Soga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/713,540

(22) Filed: May 15, 2015

(65) Prior Publication Data
US 2015/0347069 A1    Dec. 3, 2015

(30) Foreign Application Priority Data

May 27, 2014   (JP) .................................. 2014-109433

(51) Int. Cl.
| | |
|---|---|
| *H04N 1/00* | (2006.01) |
| *G06F 3/12* | (2006.01) |
| *H04N 1/32* | (2006.01) |
| *H04N 1/047* | (2006.01) |

(52) U.S. Cl.
CPC .......... *G06F 3/1243* (2013.01); *G06F 3/1204* (2013.01); *H04N 1/00572* (2013.01); *H04N 1/047* (2013.01); *H04N 1/32144* (2013.01); *H04N 1/00758* (2013.01)

(58) Field of Classification Search
None
See application file for complete search history.

(56) References Cited

U.S. PATENT DOCUMENTS

| | | | | |
|---|---|---|---|---|
| 6,522,426 B1* | 2/2003 | Park | .................... | H04N 1/32133 358/1.9 |
| 7,446,896 B2* | 11/2008 | Barrios | ................. | G06F 17/211 358/1.12 |
| 7,581,800 B2* | 9/2009 | Tanaka | .................... | B41J 11/009 347/14 |
| 7,747,036 B2* | 6/2010 | Kashioka | ........... | H04N 1/00968 382/100 |
| 9,016,688 B2* | 4/2015 | Miyamoto | ............... | B65H 9/20 271/227 |
| 2006/0224895 A1* | 10/2006 | Mayer | .................. | G06Q 20/389 713/176 |
| 2007/0229920 A1* | 10/2007 | Fukushima | ........ | H04N 1/00795 358/488 |

(Continued)

FOREIGN PATENT DOCUMENTS

JP    2009-15445 A    1/2009

*Primary Examiner* — Miya J Cato

(74) *Attorney, Agent, or Firm* — Fitzpatrick, Cella, Harper & Scinto

(57) ABSTRACT

Image data is obtained by reading an image of a sheet by a reading unit, and a location of the sheet to which a predetermined image is to be attached is specified. The sheet that has been read is conveyed to a position of a printing unit, and the predetermined image is caused to be printed at the specified location of the sheet by the printing unit, and then the sheet on which the predetermined image has been printed is caused to be conveyed to a read position of the reading unit and read by the reading unit, and image data of the sheet is output.

11 Claims, 13 Drawing Sheets

(56) References Cited

U.S. PATENT DOCUMENTS

| | | | | |
|---|---|---|---|---|
| 2008/0043294 A1* | 2/2008 | Su | ............... | H04N 1/00572 |
| | | | | 358/474 |
| 2011/0038015 A1* | 2/2011 | Tsujita | ............... | H04N 1/32144 |
| | | | | 358/448 |
| 2013/0308146 A1* | 11/2013 | Pouyadou | ............... | G03G 15/5029 |
| | | | | 358/1.12 |

* cited by examiner

F I G. 10
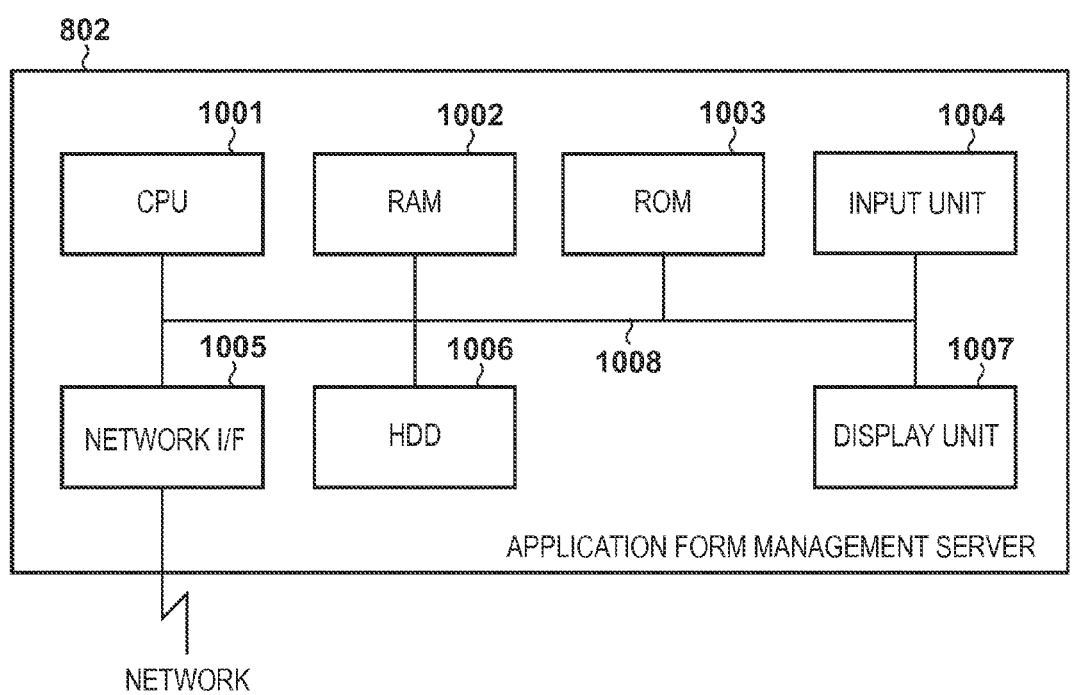

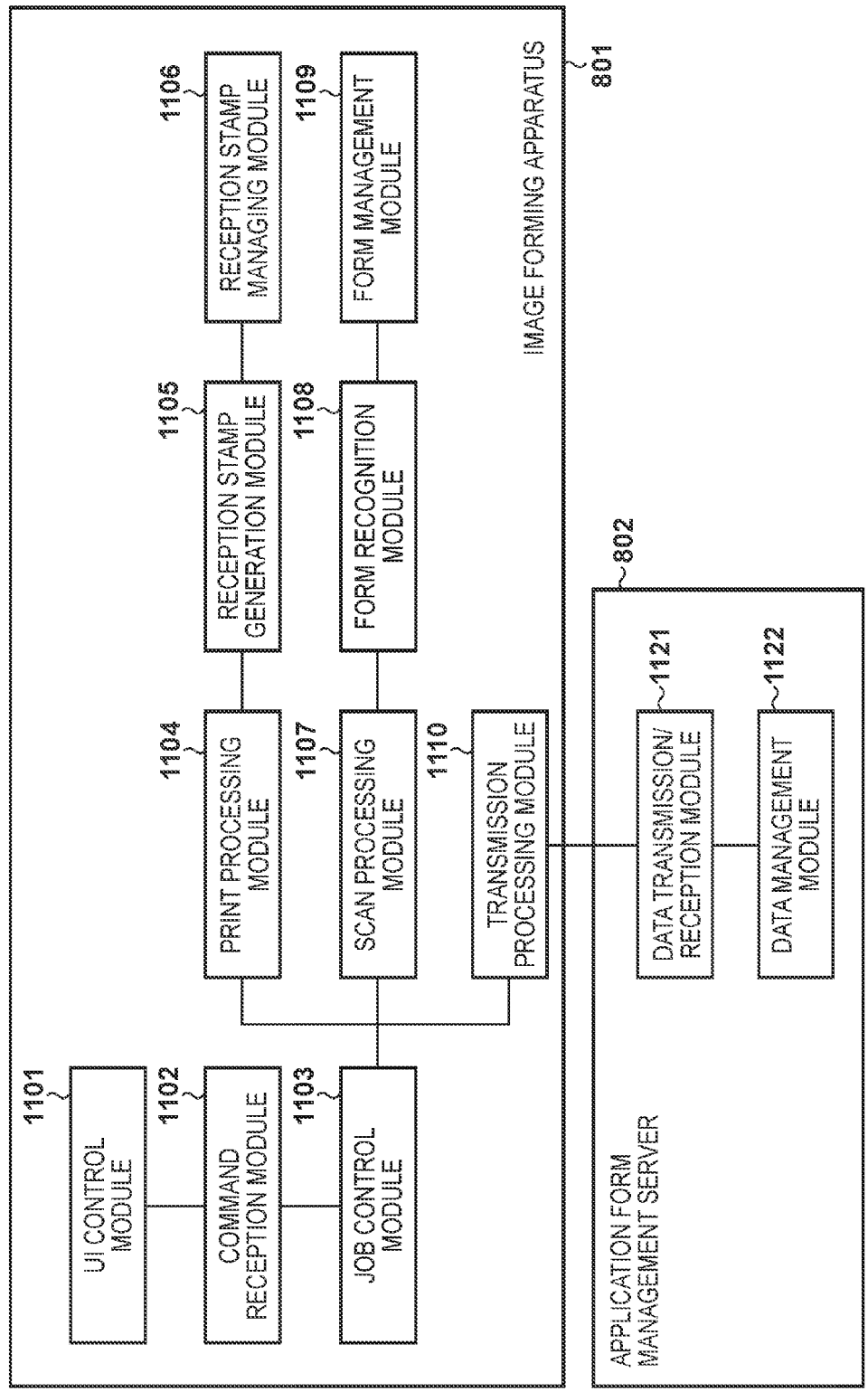

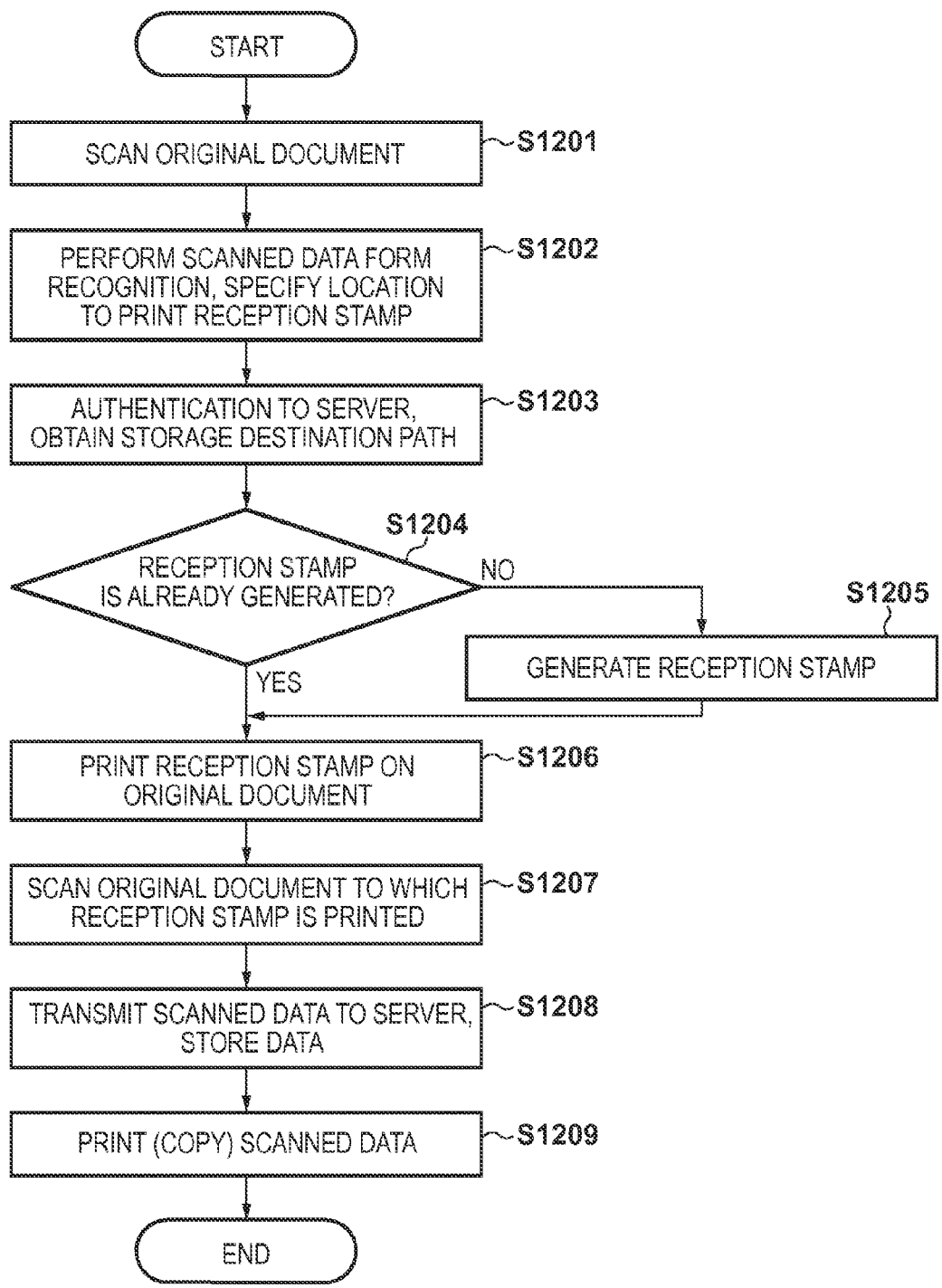

FIG. 13A

APPLICATION RECEPTION

LOGIN NAME

PASSWORD

LOGIN

FIG. 13B

APPLICATION RECEPTION

STAMP PRINT AND SCAN

CLOSE

FIG. 13C

APPLICATION RECEPTION

APPLICATION RECEPTION COMPLETED.

CLOSE

F I G. 14
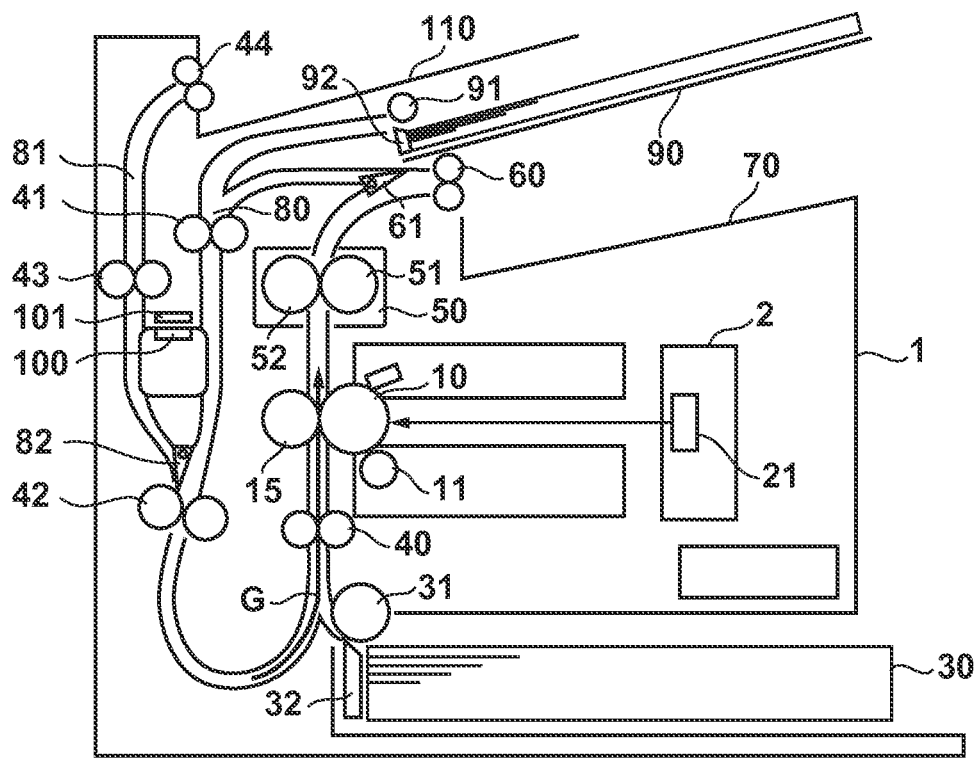

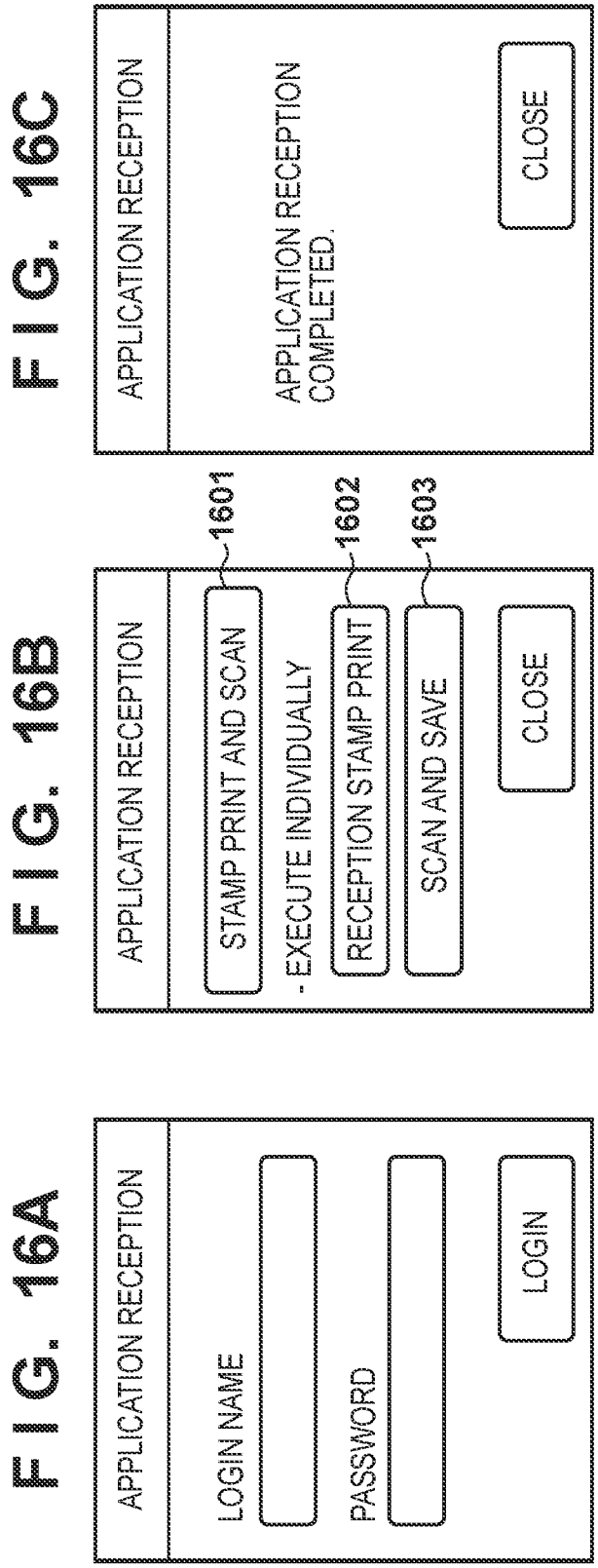

APPARATUS FOR PRINTING ON A SHEET AND CONVEYING THE PRINTED SHEET TO A READING UNIT TO READ, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

There is an application reception service in which at a store, a clerk at a reception counter receives an application form from a customer, and performs a procedure of receiving the application form from the customer. In such an application reception service, management of storing on a server electronic data into which the application form is computerized is performed in addition to storing a copy of the application form in paper form (for example, refer to Japanese Patent Laid-Open No. 2009-15445).

In the above described application reception service, there are cases in which a clerk at a reception counter must make additions (adding an imprint of a reception stamp, a receipt number or the like) to the application form prior to computerizing and saving the application form. In such a case, it is necessary for the clerk at a reception counter makes such additions manually or to set the application form onto which a reception stamp is to be printed by a printer in a scanner, and transmit image data obtained by reading by the scanner to the server to be stored. In other words, because the clerk at a reception counter must perform respective work on the application form separately, the process is cumbersome. Also, in a case where copying of an application form to which an addition is made is necessary, it is necessary to perform copying work additionally.

SUMMARY OF THE INVENTION

An aspect of the present invention is to eliminate the above-mentioned problems which are found in the conventional technology.

A feature of the present invention is to provide a technique by which an addition of a predetermined image to a sheet that was read, a storing of data of the sheet to which the predetermined image is added, and copying of the sheet can be executed automatically without the involvement of a user.

The present invention in its first aspect provides an image processing apparatus, comprising: a reading unit configured to obtain image data by reading an image of a sheet; a printing unit configured to print an image; a specification unit configured to specify a location of the sheet to which a predetermined image is to be attached; a print processing unit configured to convey the sheet read by the reading unit to the printing unit and to cause the predetermined image to be printed at the location of the sheet specified by the specification unit; and an output unit configured to cause the sheet on which the predetermined image has been printed by the print processing unit to be conveyed to a read position of the reading unit and read by the reading unit, and to output image data obtained by the reading unit.

The present invention in its second aspect provides a method of controlling an image processing apparatus having a reading unit and a printing unit, the method comprising: obtaining image data by reading an image of a sheet by the reading unit; printing an image by the printing unit; specifying a location of the sheet to which a predetermined image is to be attached; conveying the sheet read by the reading unit to the printing unit and causing the predetermined image to be printed at the location of the sheet specified in the specifying; and causing the sheet on which the predetermined image has been printed by the printing unit to be conveyed to a read position of the reading unit and to be read, and outputting image data obtained by reading the sheet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a block diagram for explaining an example of a hardware configuration of the application form management server according to the first embodiment.

FIG. 11 is a software configuration diagram of an application form management system according to the first embodiment.

FIG. 12 is a flowchart for describing processing for receiving an application form (an original document) in the image forming apparatus according to the first embodiment.

FIG. 13A through FIG. 13C depict views for showing examples of application reception screens displayed on an operation unit in the first embodiment.

FIG. 14 depicts a view for explaining a situation in which printing of image data of a reception stamp is performed on the original document (application form) read by an image reading unit.

FIG. 16A through FIG. 16C depict views for showing examples of application reception screens displayed on a console unit in the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
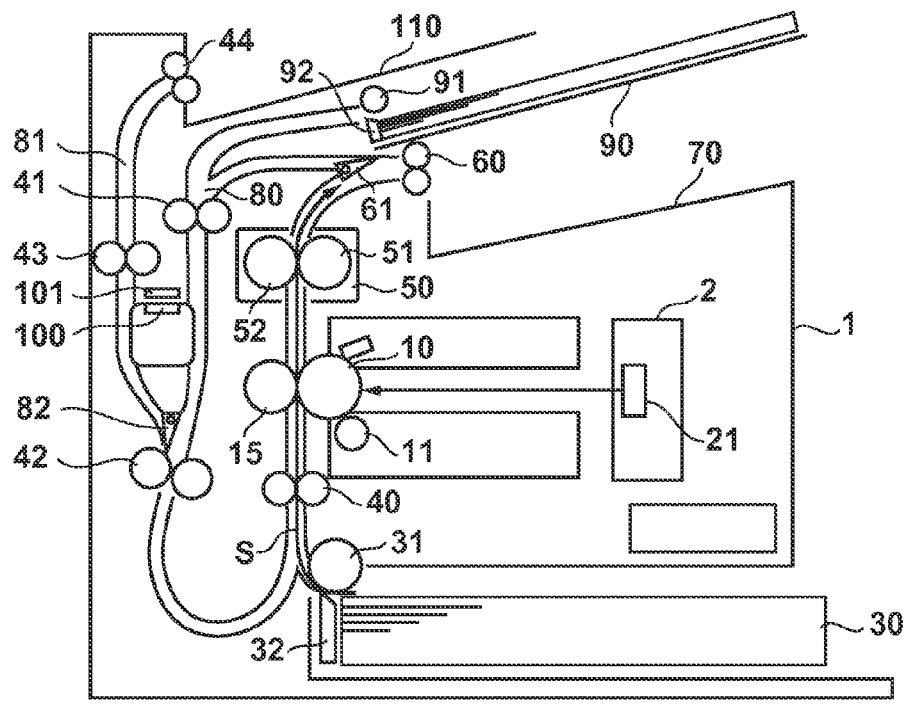
FIG. 1 depicts a view for explaining a movement of a recording material S until a toner image is transferred and is fixed to the recording material S, which is fed from a first sheet feeding unit in an image forming apparatus according to a first embodiment of the present invention.

FIG. 1 depicts a view for explaining a movement of a recording material S until a toner image is transferred and is fixed to the recording material S which is fed from a first sheet feeding unit 30 in an image forming apparatus 1 according to a first embodiment of the present invention. Below, the same reference numerals are shown for common portions in FIG. 1 through FIG. 7.

A photosensitive drum 10 and a developing roller 11 are arranged in the image forming apparatus 1. The photosensitive drum 10 is an image carrying member that is able to rotate. The developing roller 11 abuts the photosensitive drum 10 and is rotated while holding a toner. In a case where an optical unit 2 receives an image signal, a light emitting unit 21 modulates a laser beam, irradiating a surface of the rotating photosensitive drum 10 according to the image signal. A latent image is formed by an electric charge on the surface of the photosensitive drum 10 where the laser beam is irradiated. After that, a toner image is formed on the surface of the photosensitive drum 10 by rotating the developing roller 11 and supplying a toner to the latent image formed on the surface of the photosensitive drum 10.

The first sheet feeding unit 30 accommodates a recording material (sheet) such as printing paper. A recording material S accommodated in the first sheet feeding unit 30 is conveyed to a location of a conveyance roller 40 one sheet at a time by a pick-up roller 31 and a separation unit 32. In FIG. 1, a bold line arrow shows the recording material S. The rotation of the conveyance roller 40 is controlled and the recording material S is conveyed to a transfer unit 15 such that a leading edge of the recording material S conveyed by the rotation of the conveyance roller 40 aligns with the toner image formed on the surface of the photosensitive drum 10. The toner image is transferred to the recording material S by an applied bias and pressure added by the transfer unit 15, and the recording material S is conveyed to a fixing unit 50 after the toner image has been transferred to it. A heating roller 51 which is able to rotate and a pressing roller 52 which is able to rotate face each other in the fixing unit 50, and the toner image is fixed to the recording material S by heat from the heating roller 51 and pressure from the pressing roller 52. In this way, the recording material S to which the toner image has been fixed is conveyed to the location of a discharge roller 60, and in a case of single-sided printing, the recording material S is discharged from the apparatus by the rotation of the discharge roller 60 and is stacked on a first discharge unit 70.

Figure 2:
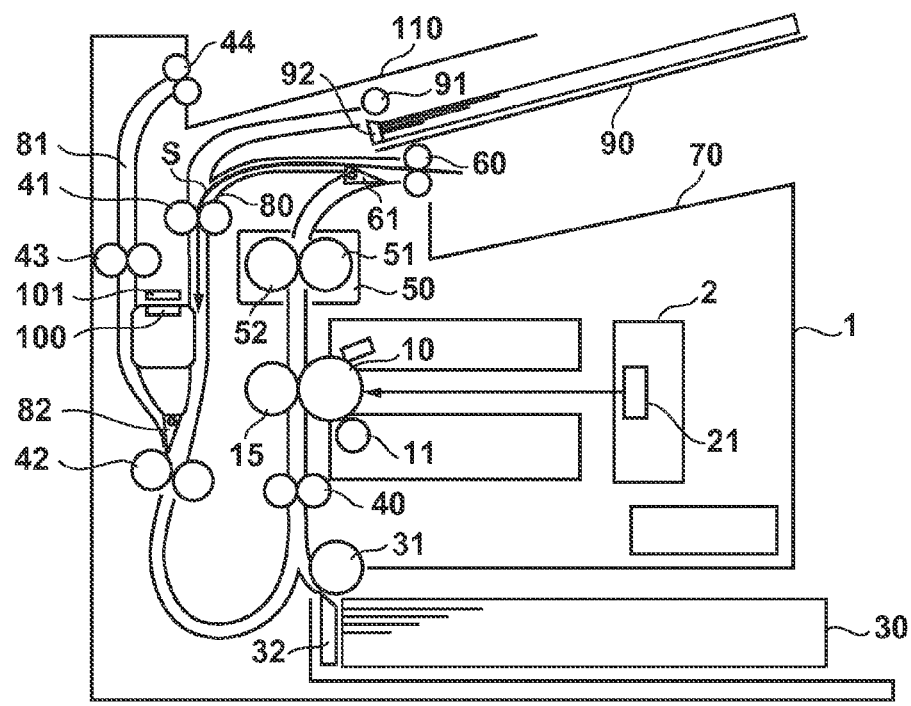
FIG. 2 depicts a view for explaining a process of a double-sided printing for printing an image on a back-side which is performed in the image forming apparatus according to the first embodiment after a toner image is transferred and is fixed on the recording material S.

FIG. 2 depicts a view for explaining a double-sided printing process for printing an image on the back-side of the recording material S after a toner image is transferred and is fixed to the recording material S in the image forming apparatus 1 according to the first embodiment.

After the recording material S is conveyed in a direction of the first discharge unit 70 by a rotation of the discharge roller 60 and a trailing edge of the recording material S has passed a flapper 61, the flapper 61 switches a conveyance path. After that, the recording material S is conveyed to a double-sided conveyance path 80 for conveying for a double-sided printing by causing the discharge roller 60 to rotate in reverse in order to print on the back-side of the recording material S, one side which is already printed. Furthermore, the recording material S is conveyed to an image reading unit 100 by a rotation of a conveyance roller 41 in the double-sided conveyance path 80. After that, once again the recording material S is conveyed to the transfer unit 15 by the rotation of a conveyance roller 42 and the conveyance roller 40. The transferring and the fixing of the toner image is performed to the back-side of the surface of the recording material S where an image has already been printed, and the recording material S to which the double-sided printing has been applied in this way is discharged to and is stacked on the first discharge unit 70 by the rotation of the discharge roller 60.

Next, with reference to FIG. 3-FIG. 7, explanation will be given for an operation of double-sided copying in which images of a double-side original document are read and printed on both sides of the recording material S.

Figure 3:
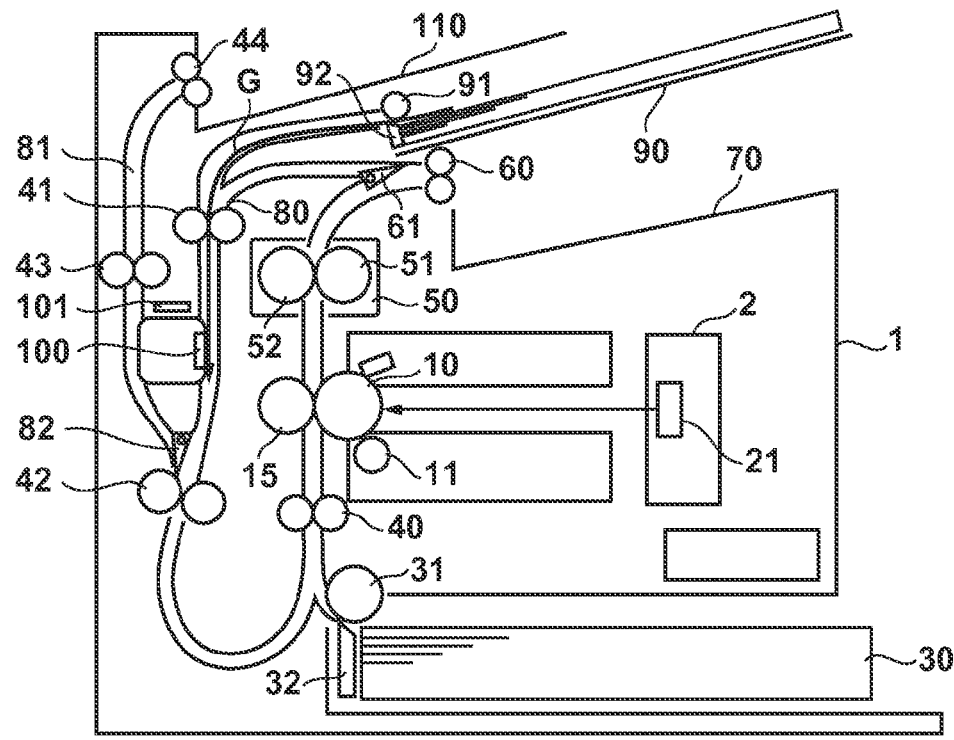
FIG. 3 depicts a view for explaining reading of a first surface of an original document in the image forming apparatus according to the first embodiment.

FIG. 3 depicts a view for explaining reading a first surface of an original document in the image forming apparatus 1 according to the first embodiment. In FIG. 3, a bold line arrow shows an original G.

The original G, which is accommodated in a second sheet feeding unit 90, is conveyed to a location of the conveyance roller 41 in the double-sided conveyance path 80 by a pick-up roller 91 and a separation unit 92 one sheet at a time. Prior to initiating the reading of the first surface (an upper surface of the original document when placed on the second sheet feeding unit 90) of the original G, a light emission is performed on a white reference plate 101 by the image reading unit 100, and the image reading unit 100 performs a correction of a white reference value based on reflection light from the white reference plate 101. Then, the image reading unit 100 rotates to a position to face the double-sided conveyance path 80 as shown in FIG. 3. Then the conveyance roller 41 is rotationally driven and the original G is conveyed to the image reading unit 100. In this way, the image reading unit 100 reads the first surface of the original G, and image information of the first surface obtained by the image reading unit 100 is stored on an image memory (a RAM 902 or an HDD 905 in FIG. 9) as the image information of the first surface of the original G. Here, the white reference plate 101 is always arranged to face downward so that dirt does not adhere to it.

Figure 4:
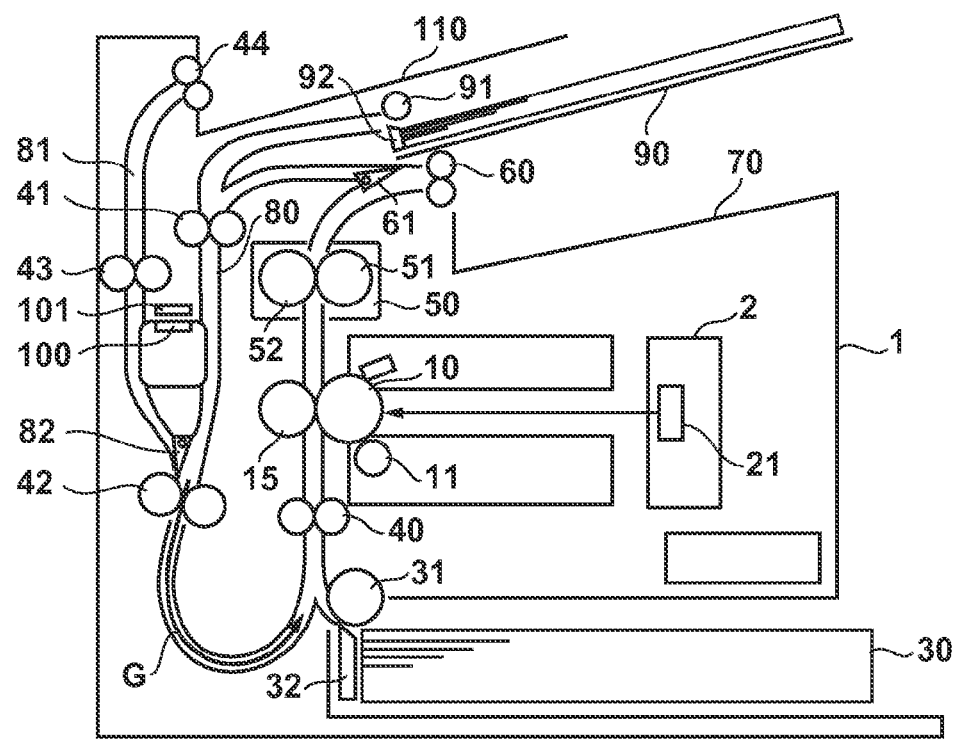
FIG. 4 depicts a view for explaining a situation when the reading of a first surface of the original document has been completed in the image forming apparatus according to the first embodiment.

FIG. 4 depicts a view for explaining a situation in which the reading of the first surface of the original document is completed in the image forming apparatus 1 according to the first embodiment.

The original G which passes the image reading unit 100 is conveyed by the rotation of the conveyance roller 42. The rotation of the conveyance roller 42 terminates at the point in time when the trailing edge of the original G passes a switchback flapper 82. At this time, the original G is stopped in a situation where the original G is nipped by the conveyance roller 42. After a lapse of a predetermined time period, the conveyance roller 42 reverse rotates and the original G is conveyed to an original document conveyance path 81. Within the predetermined time period, the switchback flapper 82 is switched such that the original G is conveyed not to the double-sided conveyance path 80, but to the original document conveyance path 81.

Figure 5:
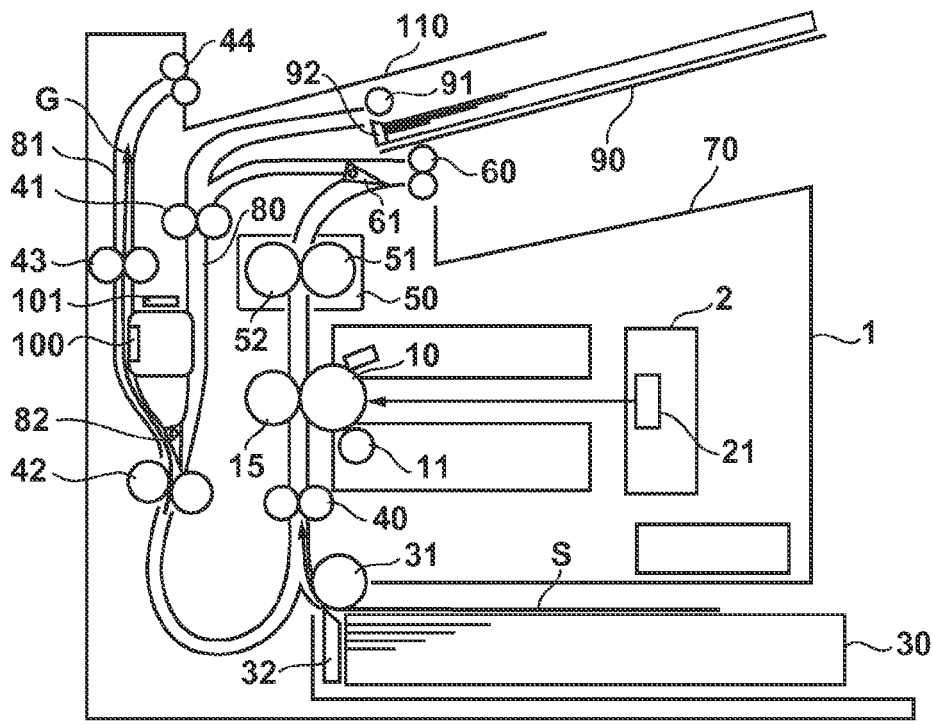
FIG. 5 depicts a view for explaining reading of a second surface of the original document and up until the printing of an image of the second surface to the recording material S in the image forming apparatus according to the first embodiment.

FIG. 5 depicts a view for explaining reading the second surface of the original document and printing the image of the second surface on the recording material S in the image forming apparatus 1 according to the first embodiment.

At the same time that the switchback flapper 82 switches the conveyance path of the original G from the double-sided conveyance path 80 to the original document conveyance path 81, the image reading unit 100 rotates to the position to face the original document conveyance path 81 as shown in FIG. 5. Then, when the conveyance roller 42 starts reverse rotation, the original G is conveyed to the location of the image reading unit 100 via the original document conveyance path 81. In this way, when the original G passes through the image reading unit 100, the image reading unit 100 reads the second surface (the back-side of the original document when stacked on the second sheet feeding unit 90) of the original G, and the image information of the second surface obtained by the reading is stored on the image memory as the image information of the second surface of the original G. Note, in a case where single-sided reading is designated, the reading of the image information of the second surface is not performed.

On the other hand, the recording material S accommodated in the first sheet feeding unit 30 is conveyed to the location of the conveyance roller 40 one sheet at a time similarly to in the previously described case of FIG. 1. Mostly at the same time, the light emitting unit 21 modulates a laser beam based on the image information of the second surface of the original G stored on the image memory, irradiates the modulated laser beam on the surface of the photosensitive drum 10, and a latent image based on the image information of the second surface of the original G is formed on the surface of the photosensitive drum 10. In this way, the toner image corresponding to the second surface of the original G formed by the latent image is transferred to the recording material S by the transfer unit 15, the toner image is fixed to the recording material S by the fixing unit 50, and the image forming based on the image information of the second surface of the original G is completed. Note, in FIG. 5, the conveyance of the recording material S is started in conjunction with the initiation of the reading of the second surface of the original G, but the conveyance of the recording material S may be initiated after the reading of the second surface of the original G.

Figure 6:
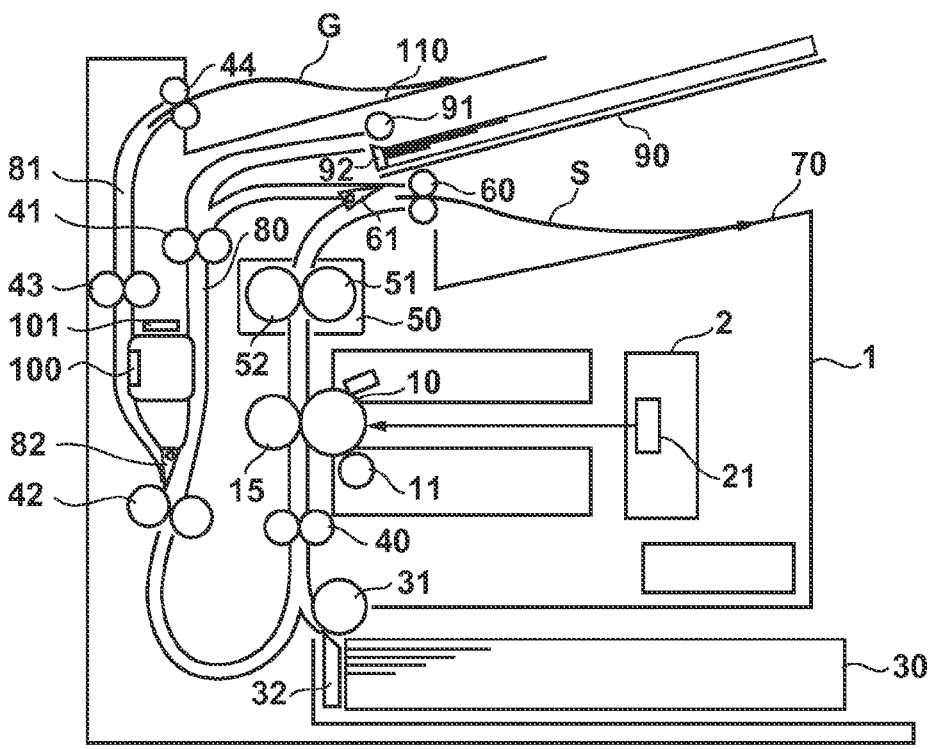
FIG. 6 depicts a view for explaining a situation when the reading of the second surface of the original document has been completed in the image forming apparatus according to the first embodiment.

FIG. 6 depicts a view for explaining a situation in which the reading of the second surface of the original document is completed in the image forming apparatus 1 according to the first embodiment.

The original G, for which reading has been completed, is discharged from the apparatus and is stacked on a second discharge unit 110 by the rotation of a conveyance roller 43 and a conveyance roller 44. Here, in a case where the trailing edge of the original G passes through the switchback flapper 82, the switchback flapper 82 switches the conveyance path of the recording material S from the original document conveyance path 81 to the double-sided conveyance path 80. With this, the recording material S conveyed through the double-sided conveyance path 80 is conveyed to the location of the conveyance roller 40. In FIG. 6, the recording material S indicated by a bold line is the recording material on which the image of the second surface of the original G in FIG. 5 has been printed.

Figure 7:
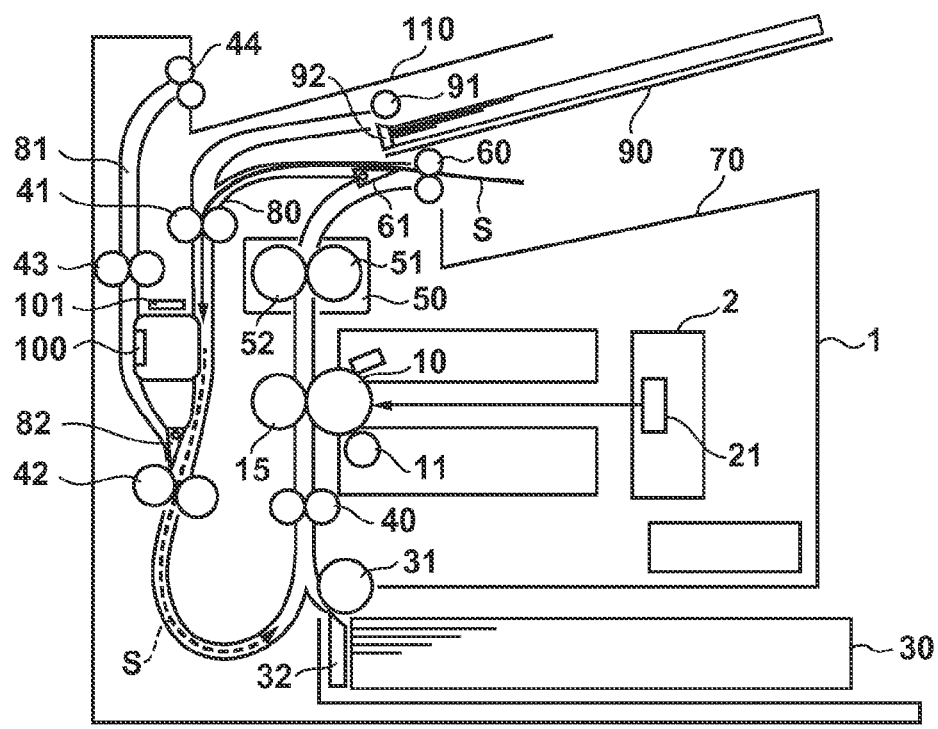
FIG. 7 depicts a view for explaining image forming based on image information of the first surface of the original document in the image forming apparatus according to the first embodiment.

FIG. 7 depicts a view for explaining image forming based on the image information of the first surface of the original document in the image forming apparatus 1 according to the first embodiment.

As previously explained with reference to FIG. 2, the recording material S where the image of the second surface of the original G has been printed is conveyed in the discharge direction, and after the trailing edge of the recording material S passes through the flapper 61, the flapper 61 switches the conveyance path. Then, the discharge roller 60 starts reverse rotation and conveys the recording material S to the double-sided conveyance path 80. The recording material S conveyed to the double-sided conveyance path 80 passes through the image reading unit 100, is conveyed to the location of the conveyance roller 40 by the rotation of the conveyance roller 42, and is conveyed to the transfer unit 15 by the rotation of the conveyance roller 40. In FIG. 7, a broken line arrow shows this situation.

The light emitting unit 21 modulates the laser beam based on the image information of the first surface of the original G stored on the image memory and irradiates the laser beam on the surface of the photosensitive drum 10, and a latent image that is based on the image information of the first surface of the original G is formed on the surface of the photosensitive drum 10. The toner image formed by the latent image is transferred to the recording material S by the transfer unit 15, the toner image is fixed to the recording material S by the fixing unit 50, and thereby the image forming based on the image information of the first surface of the original G is completed. After that, the recording material S is discharged and stacked on the first discharge unit 70.

Above, the explanation is given for double-sided copy processing of the original document in the image forming apparatus 1 according to the first embodiment.

Next, explanation will be given for a configuration of an application form management system according to the first embodiment.

Figure 8:
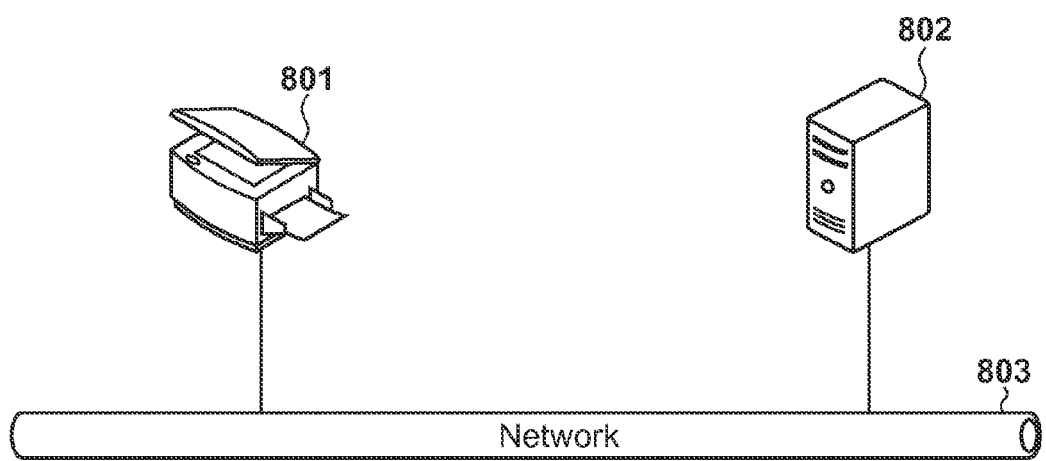
FIG. 8 depicts a view for explaining a configuration of an application form management system according to the first embodiment.

FIG. 8 depicts a view for explaining a configuration of an application form management system according to the first embodiment.

The application form management system comprises an image forming apparatus 801 and an application form management server 802. The image forming apparatus 801 is an apparatus comprising a printing function, a scanning function, or the like, and details such as its hardware configuration will be explained later. Each apparatus is communicatively connected to each other via a network 803 such as Ethernet (registered trademark). Also, the image forming apparatus 801 is equivalent to the image forming apparatus 1 explained with reference to FIG. 1 through FIG. 7.

Figure 9:
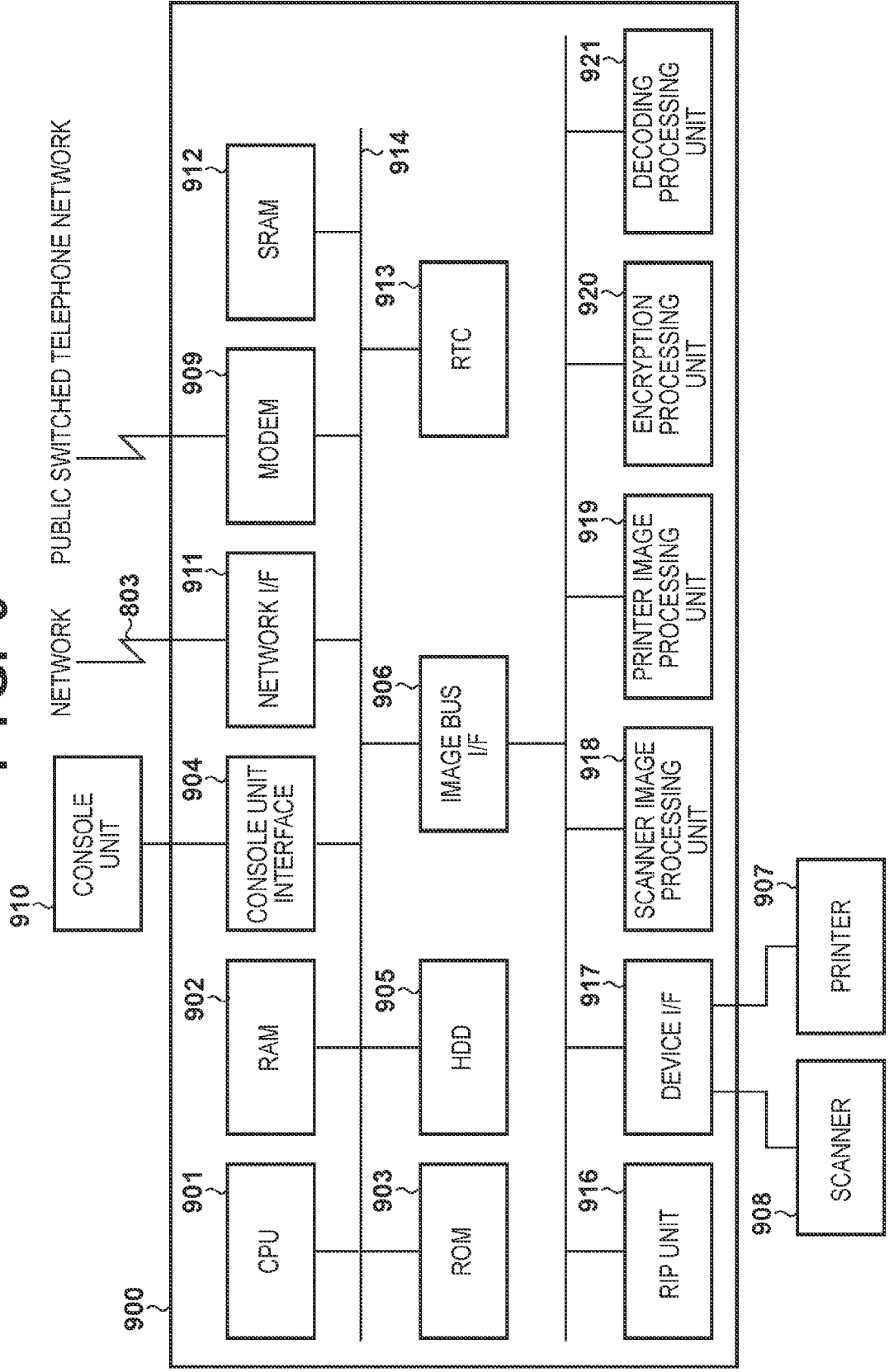
FIG. 9 is a block diagram for explaining a hardware configuration of the image forming apparatus according to the first embodiment.

FIG. 9 is a block diagram for explaining a hardware configuration of the image forming apparatus 801 according to the first embodiment. A control unit 900 is connected to a scanner 908 comprising the image reading unit 100 for reading an image and a printer 907 (printing unit) which includes the transfer unit 15 and the photosensitive drum 10 and prints an image on an original document or a recording material. Also, the control unit 900 is connected to the network 803 or the public switched telephone network, and performs input and output of image information or device information via the line.

A CPU 901 is a processor for controlling the whole of the image forming apparatus 801. The RAM 902 provides a system work memory for operation of the CPU 901, and is used as an image memory for temporarily storing the image data. Also, the image forming apparatus 801 is capable of communicating with the application form management server 802 via a network interface (I/F) 911 in response to an instruction of the CPU 901. For example, the image forming apparatus 801 transmits to the application form management server 802 image data obtained by reading an application form by the scanner 908.

The RAM 902 serves as a main memory of the CPU 901, a work area, or the like. In the RAM 902, image setting information, job logs or operation logs corresponding to when processes are performed, or the like, are stored. A ROM 903 is a boot ROM and stores a boot program of the system. The HDD 905 is a hard disk drive, and stores system software, applications, and image data. Also, a program for executing a flowchart explained later in FIG. 12 is stored in the HDD 905. Note, each step of the flowchart is executed by the CPU 901. However, a processor other than the CPU 901 may execute each step in the above described flowchart, or another processor may cooperate with the CPU 901 and execute processing in the flowchart.

A console interface 904 is an interface for controlling a display unit comprising a touch panel function, a key input via screen of the display unit, input of hard keys, or the like, and the console interface 904 outputs the image data to be displayed on a console unit 910 to the console unit 910. Also, the console interface 904 performs a role of transmitting to the CPU 901 information inputted by a user of the system using the console unit 910. The network interface 911 is connected to the network 803 and performs input and output of information. A modem 909 is connected to the public switched telephone network, and performs input and output of information via the public switched telephone network. An SRAM 912 is a non-volatile recording medium capable of operating at high speed. An RTC (real-time clock) 913 times the current date and time even in a situation where an electric power supply is not supplied to the control unit 900. In the first embodiment, the RTC 913 is used for clocking a date and time relating to the later explained job logs. The above describe parts are arranged on a system bus 914.

An image bus I/F 906 is a bus bridge for connecting the system bus 914 to an image bus 915 for transferring image data at high speed and converts data configurations. The image bus 915 is constituted by a PCI bus or an IEEE 1394. The following devices are arranged on the image bus 915. An RIP unit 916 is a raster image processor, and the RIP unit 916 extracts PDL data to a bitmap image. A device I/F 917 connects the scanner 908 and the printer 907 to the control unit 900, and performs conversion between a synchronous system and an asynchronous system for image data. A scanner image processing unit 918 performs correction, processing and editing of image data inputted by the scanner 908. A printer image processing unit 919 performs correction, a resolution conversion, or the like, that corresponds to the printer 907 on image data to be output to the printer 907. An encryption processing unit 920 performs encryption processing of input data including the image data. A decoding processing unit 921 performs decoding processing of encrypted data.

FIG. 10 is a block diagram for explaining an example of a hardware configuration of the application form management server 802 according to the first embodiment.

A CPU 1001, a RAM 1002, a ROM 1003, an input unit 1004, a network I/F 1005, a hard disk drive (HDD) 1006, and a display unit 1007 are communicatively connected to each other via a system bus 1008.

Control programs such as an operating system and applications are stored on the ROM 1003 or the HDD 1006. The CPU 1001 provides a function of a computer by deploying control programs as necessary from the ROM 1003 or the HDD 1006 into the RAM 1002 and executing them. Also, the CPU 1001 performs communication with other apparatuses on the network connected via the network I/F 1005. The input unit 1004 includes a keyboard, a pointing device, or the like, and receives operations from a user. The display unit 1007 performs displaying of input screens or the like to the user.

FIG. 11 depicts a view for explaining a software configuration diagram of an application form management system according to the first embodiment. Each block in FIG. 11 represents a function that is realized by executing software (programs) which is processed by the image forming apparatus 801 or the application form management server 802.

The image forming apparatus 801 analyzes a command received from a UI control module 1101, executes the analyzed information functioning as a job, and prints or scans data.

Next, detail of processing upon printing/scanning is explained.

In a case where the UI control module 1101 receives a command by an operation of the user via the console unit 910, the command is received by a command reception module 1102 of the image forming apparatus 801. Then, the received command is transferred to a job control module 1103. In a case where a command is received by the job control module 1103, and the job control module 1103 analyzes the command, generates a job which can be interpreted by software in the image forming apparatus 801, and controls comprehensively. The job control module 1103 performs processing requests to a print processing module 1104, a scan processing module 1107, and a transmission processing module 1110 based on printing or scanning setting information included in the command, and the job control module 1103 executes printing or scan jobs. The print processing module 1104 converts a job received from the job control module 1103 into image data, and prints onto recording material or an original document by controlling units. A reception stamp generation module 1105 generates reception stamp image data indicating that the application form which was submitted by a user was received. The generated reception stamp image data is managed by a reception stamp managing module 1106. In a case where a request from the job control module 1103 is received, the scan processing module 1107 controls units, and obtains image data of an original document by scanning the original document. Then, the obtained image data is returned to the job control module 1103. A form recognition module 1108 performs form recognition using the image data obtained by scanning by the scan processing module 1107, and using a plurality of form data managed in a form management module 1109, and the form recognition module 1108 specifies a location of the original G or the recording material S where a reception stamp is printed. The transmission processing module 1110 transmits the obtained image data scanned by the scan processing module 1107 to the application form management server 802.

Next, a software configuration of the application form management server 802 is explained.

In a case where the image data transmitted by the transmission processing module 1110 of the image forming apparatus 801 is received, a data transmission/reception module 1121 stores and manages the data in a data management module 1122. Here, the image forming apparatus 801 is able to obtain the data stored in the data management module 1122 by accessing the data management module 1122 via the data transmission/reception module 1121.

FIG. 12 is a flowchart for describing processing of receiving an application form (original document) in the image forming apparatus 801 according to the first embodiment. Here, an example in which a reception stamp is printed on the application form, the application form on which the reception stamp is printed is read by the scanner 908, transmitted to the application form management server 802 and stored by the application form management server 802, and the image forming apparatus 801 copies the application form is shown. The processing is realized by the CPU 901 executing a program deployed in the RAM 902 from the HDD 905 of the image forming apparatus 801, but explanation will be as the processing by the functional units of the software shown in FIG. 11.

Firstly, the UI control module 1101 receives operation details instructed by the user via the console unit 910 of the image forming apparatus 801 in step S1201. Here, scanning of the original document is instructed, so the scan processing module 1107 conveys a sheet (here an application form) placed on the second sheet feeding unit 90 of the image forming apparatus 801 and reads by the image reading unit 100.

FIG. 13A-FIG. 13C depict views for illustrating examples of application reception screens displayed on the console unit 910 in the first embodiment.

FIG. 13A shows an acceptance screen for receiving an application; here a user inputs a login name and a password and presses a login button. FIG. 13B is a screen for querying the user as to whether or not it is desired that an application form to which a reception stamp is affixed be copied, and that image data of the application form be saved when the application is received. Here, in a case where a "stamp print and scan" button is pressed, copying of an application form to which a reception stamp is affixed, and saving of the image of the application form are performed. FIG. 13C shows a screen displayed in a case where the application reception is completed.

The previously described scan instruction of the original document in step S1201 is, for example, performed by the "stamp print and scan" button being pressed in the screen in FIG. 13B.

With this, as explained with reference to previously described FIG. 3, an original document (application form) placed on the second sheet feeding unit 90 is fed, and a first surface (front-side) of the original document conveyed through the double-sided conveyance path 80 is read by the image reading unit 100. In step S1202, the form recognition module 1108 references the form data managed by the form management module 1109, recognizes the form of the obtained original document (scan data) read by the image reading unit 100, and specifies the location of the original document (application form) where the reception stamp is to be printed.

Next the processing proceeds to step S1203, the transmission processing module 1110 connects to the application form management server 802 via the network 803, performs an authentication of the user logged into the image forming apparatus 801, and obtains a scan data storage destination path. For the storage destination path, a path that is predetermined on the application form management server 802 may be used, or a folder may be generated by adding the date and time to a predetermined path, and using that as the path.

Next the processing proceeds to step S1204, the reception stamp managing module 1106 determines whether or not the image data of the reception stamp to be printed on the application form has been generated. In a case where it is determined that the reception stamp has been generated in step S1204 the processing proceeds to step S1206, and in a case where it is determined that the reception stamp is not already generated, the processing proceeds to step S1205 where the image data of the reception stamp is generated by the reception stamp generation module 1105, after which the processing proceeds to step S1206. In this way, the generated reception stamp image data is stored and managed by the reception stamp managing module 1106. Only a mark illustrating reception, reception date, the name of the reception person in charge, or the like, may be included in the image data of the reception stamp.

In step S1206, the print processing module 1104 prints the image data of the reception stamp on the location of the application form specified in step S1202.

FIG. 14 depicts a view for explaining a situation where image data of a reception stamp is printed on an original document (application form) read by the image reading unit 100. In FIG. 14, for common portions the same reference numerals are shown in previously described FIG. 1-FIG. 7.

Here, the original G (the application form) is conveyed to the transfer unit 15 by the rotation of the conveyance roller 42 and the conveyance roller 40, and the reception stamp is printed on the front-side of the application form. FIG. 14 shows a situation where the reception stamp is printed on the front-side of the application form.

Next the processing proceeds to step S1207, the scan processing module 1107 conveys the original document (application form) to which the reception stamp has been printed in step S1206 to the location of the image reading unit 100 and reads the original document. More specifically, as previously explained with reference to FIG. 7, the original document (application form) where the reception stamp has been printed is conveyed in the direction of the first discharge unit 70, and after the trailing edge of the original document passes through the double-side flapper 61, the conveyance path is switched by the double-side flapper 61. Then, the discharge roller 60 is caused to rotate in reverse, conveying the original document to the double-sided conveyance path 80. At this time, the printing surface (front-side) of the original document does not face the side of the image reading unit 100, so at the point in time when the original document passes the switchback flapper 82, the rotation of the conveyance roller 42 is stopped. With this, the original (application form) is stopped in a situation where the original is nipped by the conveyance roller 42. Then, as explained with reference to FIG. 5, the original document (application form) is caused to be conveyed to the original document conveyance path 81 by causing the conveyance roller 42 to rotate in reverse. With this, because the front-side of the original document (application form) faces the image reading unit 100, the image of the printing surface of the original document (application form) can be read by the image reading unit 100.

Next, the processing proceeds to step S1208, and the transmission processing module 1110 transmits the image data obtained by being read by the image reading unit 100 in step S1207 to the data transmission/reception module 1121 of the application form management server 802 such that the image data is stored at the path obtained in step S1203. The data transmission/reception module 1121 passes the received data to the data management module 1122, and stores the data in the application form management server 802.

Next, the processing proceeds to step S1209, the print processing module 1104 prints the image data obtained in step S1207 on another the recording material S placed on the first sheet feeding unit 30 of the image forming apparatus 801. More specifically, as explained in FIG. 5, the recording material S accommodated in the first sheet feeding unit 30 is fed, the recording material S is conveyed to the transfer unit 15 by the rotation of the conveyance roller 40, and the image of the application form on which the reception stamp has been printed is printed on the recording material S.

As explained above, by virtue of the image forming apparatus according to the first embodiment, a processing sequence for printing the reception stamp on the application form, storing the image data of the application form on which the reception stamp has been printed, and copying the application form on which the reception stamp has been printed, can be executed without involving the user.

[Second Embodiment]

Next, explanation will be given for the second embodiment of the present invention. In the second embodiment, an approach to determining in accordance with an operation of a user to execute processing in which the image forming apparatus 801 prints a reception stamp on an application form and scans the application form on which the reception stamp has been printed, or processing in which scanned image data of an application form is transmitted to the application form management server 802, or processing for copying of image data of an application form will be explained. Note, a configuration of the image forming apparatus 801 and the application form management server 802 according to the second embodiment is the same with that of the previously described first embodiment, their explanation is omitted.

Figure 15A:
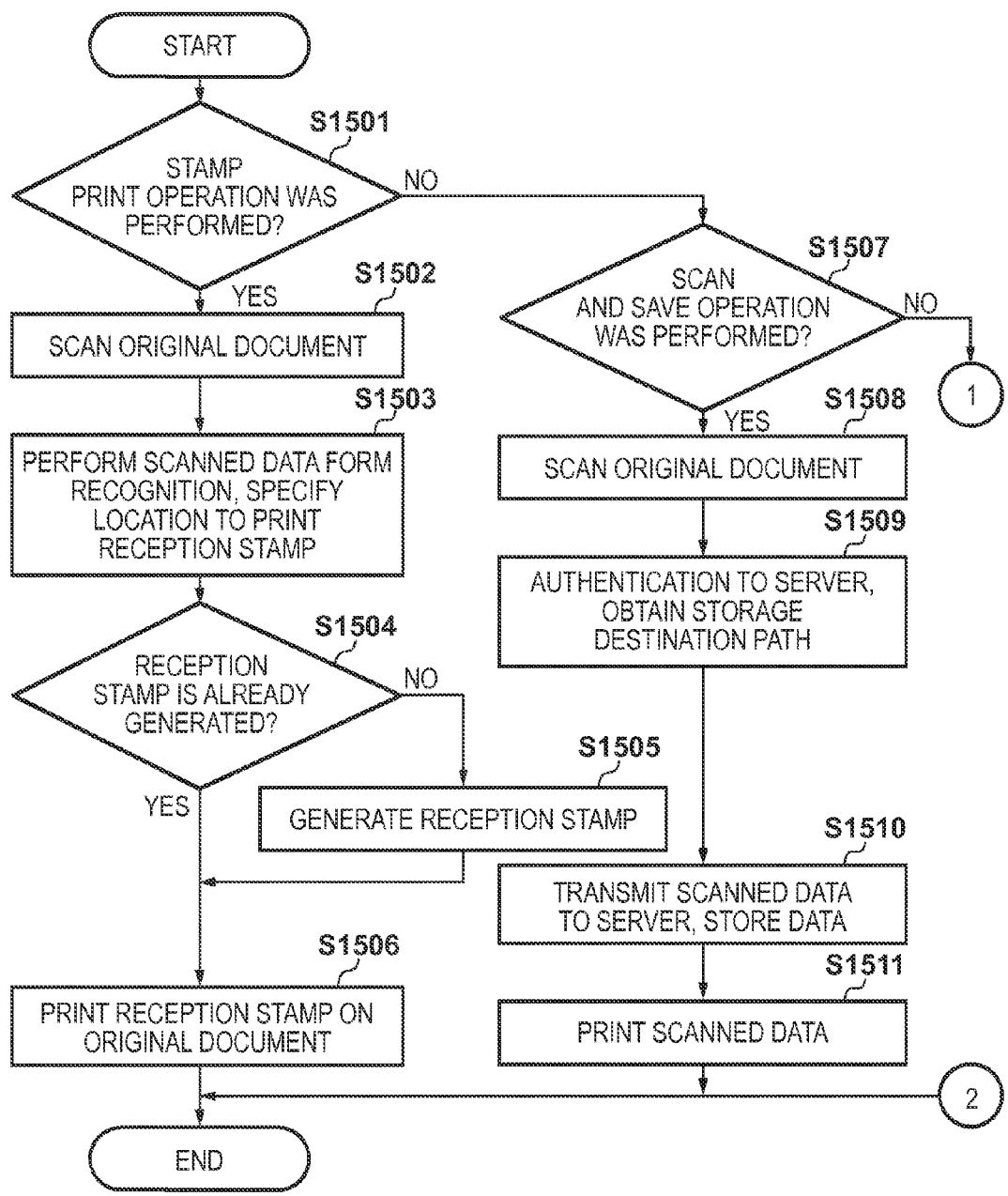
FIGS. 15A and 15B are flowcharts for describing processing for receiving an application form (an original document) in the image forming apparatus according to the second embodiment.
Figure 15B:
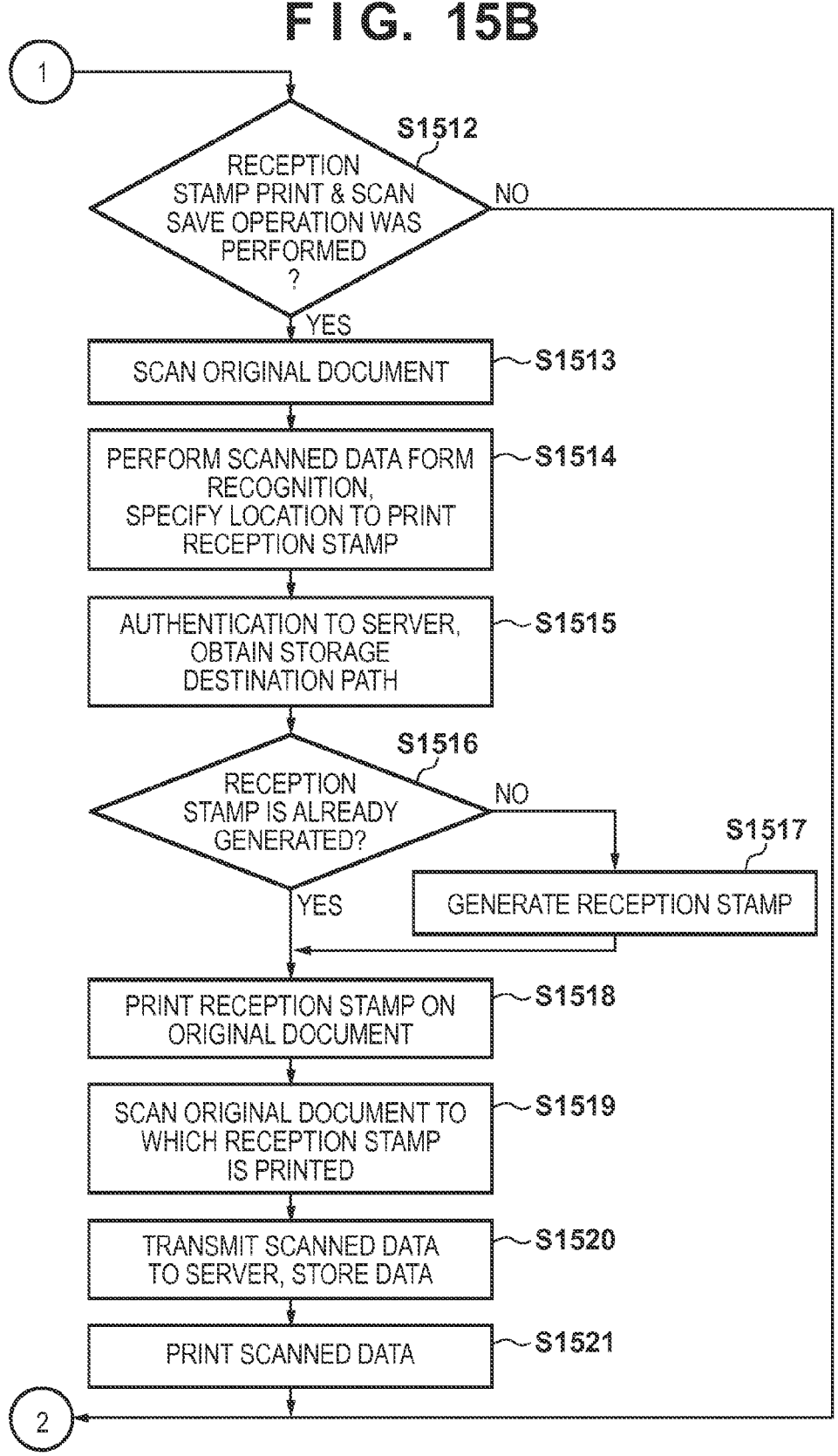

FIGS. 15A and 15B are flowcharts for describing processing of receiving an application form (original document) in the image forming apparatus 801 according to the second embodiment. Here, an example in which, in accordance with an operation by a user, the image forming apparatus 801 transmits data into which an original document (the application form) is scanned to the application form management server 802, and prints a reception stamp is shown. The processing is realized by the CPU 901 executing a program deployed into the RAM 902 from the HDD 905 of the image forming apparatus 801, but explanation will be as the processing by the functional units of the software shown in FIG. 11.

First, in step S1501, the UI control module 1101 receives an operation selected by the user, and determines whether the operation performed by the user is a reception stamp print operation.

FIG. 16A-FIG. 16C depict views for illustrating examples of application reception screens displayed on the console unit 910 in the second embodiment.

FIG. 16A shows an acceptance screen for receiving an application; here a user inputs a login name and a password and presses a login button. FIG. 16B shows an example of a screen for specifying whether copying of an application form to which a reception stamp is affixed and saving of image data of the application form is desired, or whether to only print a reception stamp on the application form, or to only save image data of the application form. A stamp print and scan button 1601 is a button for instructing the execution of processing that is similar to the previously described first embodiment. A stamp print button 1602 is a button for instructing only to print the reception stamp on the application form, and a scan button 1603 is a button for instructing only to save image data of the application form. FIG. 16C shows an example of a screen displayed when the application reception is completed.

Accordingly, in step S1501, it is determined whether or not the stamp print button 1602 is instructed, and in a case where the stamp print button 1602 is instructed, the processing proceeds to step S1502. In step S1502, similarly to in step S1201 in FIG. 12, the scan processing module 1107 conveys the original document placed on the second sheet feeding unit 90 of the image forming apparatus 801 and reads the original document. Here, as shown in previously described FIG. 3, the original document (application form) placed on the second sheet feeding unit 90 is fed, and the first surface (front-side) of the original document fed through the double-sided conveyance path 80 is read by the image reading unit 100. Next the processing proceeds to step S1503, and similarly to in step S1202 in FIG. 12, the form recognition module 1108 recognizes the form of the scan data (the application form) by referring to the form data managed by the form management module 1109, and specifies the location on the application form where the reception stamp is to be printed. Next, the processing proceeds to step S1504, and similarly to in step S1204 in FIG. 12, the reception stamp managing module 1106 determines whether the image data of the reception stamp has been generated, and in a case where the image data of the reception stamp has not been generated, the processing proceeds to step S1505. In step S1505, similarly with step S1205 in FIG. 12, the reception stamp generation module 1105 generates the image data of the reception stamp and the processing proceeds to step S1506. In this way, the generated reception stamp image data is managed by the reception stamp managing module 1106. In step S1506, the print processing module 1104 prints the image data of the reception stamp on the application form similarly to in step S1206 of FIG. 12.

In this way in a case where the stamp print button 1602 is pressed, only the printing of the reception stamp is executed.

In step S1501, in a case when an instruction is not made on the stamp print button 1602, the processing proceeds to step S1507, it is determined whether or not the scan button 1603 is instructed. In a case where the scan button 1603 is instructed, the processing proceeds to step S1508, the scan processing module 1107 conveys the original document (application form) placed on the second sheet feeding unit 90 of the image forming apparatus 801 and reads the original document by the image reading unit 100. Here, as shown in FIG. 3, the original document (application form) placed on the second sheet feeding unit 90 is fed, and the first surface (front-side) of the original document conveyed through the double-sided conveyance path 80 is read by the image reading unit 100. After that, processing that is the same as previously described step S1203, step S1208, step S1209 in FIG. 12 is executed in step S1509 through step S1511. Below, to explain briefly, the transmission processing module 1110, in step S1509, connects to the application form management server 802, performs the authentication of the user logged in the image forming apparatus 801, and obtains the storage destination path of the scanned image data. In step S1510, the transmission processing module 1110 transmits the image data obtained in step S1508 to the data transmission/reception module 1121 such that the image data is stored in the path obtained in step S1509. With this, the data transmission/reception module 1121 stores the received data in the data management module 1122. In step S1511, the print processing module 1104 prints the image data obtained in step S1508 on another recording material S stacked on the first sheet feeding unit 30. More specifically, printing is performed as explained with reference to FIG. 1.

In step S1507, when an instruction is not made on the scan button 1603, the processing proceeds to step S1512 (FIG. 15B), and it is determined whether or not the stamp print and scan button 1601 is instructed. Here, in a case where the stamp print and scan button 1601 is not instructed, the process is terminated without doing anything. On the other hand, it is determined that the stamp print and scan button 1601 is instructed in step S1512, the processing proceeds to step S1513. The processing in step S1513 through step S1521 is the same as the processing in step S1201 through step S1209 in FIG. 12 in the previously described first embodiment, so their explanation is omitted.

By the second embodiment, as explained above, processing for printing a reception stamp on an application form, processing for storing image data of an application form, or processing for printing a reception stamp on an application form and storing the image data of the application form on which the reception stamp has been printed can be selected and executed in accordance with an instruction of a user.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-109433, filed May 27, 2014, which is hereby incorporated by reference herein in its entirety.

What is claimed is:

1. An image processing apparatus, comprising:
a reading unit having first and second conveyance paths for conveying sheets and a scanner capable of changing a read position in order to read a sheet that passes through the first conveyance path and a sheet that passes through the second conveyance path respectively, configured to obtain image data by reading an image of a sheet;
a printer engine configured to print an image on a sheet; and
at least one processor and at least one memory that act as:
a specification unit configured to specify a location of the sheet to which a predetermined image is to be attached;
a print processing unit configured to control to convey the sheet read by the reading unit to the printer engine and to cause the predetermined image to be printed at the location of the sheet specified by the specification unit; and
an output unit configured to cause the sheet on which the predetermined image has been printed by the print processing unit to be conveyed to a read position of the reading unit and read by the reading unit, and to transmit image data of the printed sheets obtained by the reading unit to an external apparatus via the network and the printer engine prints the image data originated from a reading process by the reading unit for a copy of the printed sheet,
wherein the output unit, by causing the sheet on which the predetermined image has been printed by the print processing unit to be conveyed through the first conveyance path of the reading unit and to pass through the second conveyance path, so that the scanner for which the read position is changed to read the sheet conveyed through the second conveyance path reads a front-surface of the sheet on which the predetermined image has been printed.

2. The image processing apparatus according to claim 1, wherein the reading unit comprises a scanner, and the scanner is arranged on a double-sided conveyance path for conveying a sheet for which one surface has been printed in order to print a back surface of the sheet for a double-sided printing of the printer engine.

3. The image processing apparatus according to claim 2, wherein the print processing unit conveys the sheet read by the reading unit through the double-sided conveyance path to the printer engine, and causes the predetermined image to be printed on the same surface as a surface of the sheet read by the reading unit.

4. The image processing apparatus according to claim 1, wherein the specification unit stores a plurality of forms, and determines a form of the sheet obtained by the reading unit by referencing the plurality of forms, and specifies the location of the sheet to which the predetermined image it to be attached based on the determined form.

5. The image processing apparatus according to claim 4, wherein in a case where the specification unit determines that the sheet is an application form, the predetermined image is a reception stamp that indicates that the application form has been accepted.

6. The image processing apparatus according to claim 1, wherein the at least one processor and the at least one memory act as a copy unit configured to cause the image data output by the output unit to be printed by the printer engine.

7. The image processing apparatus according to claim 6, wherein the at least one processor and the at least one memory act as:
an operation unit configured to receive at least one of a first instruction for printing the predetermined image at the location of the sheet, a second instruction for outputting image data obtained by reading the sheet on which the predetermined image has been printed, and a third instruction for copying a sheet on which the predetermined image has been printed; and a control unit configured to control the print processing unit, the output unit and the copy unit in accordance with an instruction received via the operation unit.

8. The image processing apparatus according to claim 1, wherein the at least one processor and the at least one memory act as a generation unit configured to generate the predetermined image.

9. The image processing apparatus according to claim 1, wherein the output unit outputs the image data to a server via a network.

10. A method of controlling an image processing apparatus having a reading unit including first and second conveyance paths for conveying sheets and a scanner capable of changing a read position in order to read a sheet that passes through the first conveyance path and a sheet that passes through the second conveyance path respectively, and a printer engine, the method comprising:

obtaining image data by reading an image of a sheet by the reading unit;

printing an image on a sheet by the printer engine;

specifying a location of the sheet to which a predetermined image is to be attached;

conveying the sheet read by the reading unit to the printer engine and causing the predetermined image to be printed at the location of the sheet specified in the specifying; and causing the sheet on which the predetermined image has been printed by the printer engine to be conveyed to a read position of the reading unit and to be read, and transmitting image data obtained by reading the printed sheet to an external apparatus via the network and the printer engine prints the image data originated from a reading process by the reading unit for a copy of the printed sheet, wherein, in the causing, by causing the sheet on which the predetermined image has been printed in the printing to be conveyed through the first conveyance path of the reading unit and to pass through the second conveyance path, so that the scanner for which the read position is changed to read the sheet conveyed through the second conveyance path reads a front-surface of the sheet on which the predetermined image has been printed.

11. A non-transitory computer-readable storage medium storing a program for causing a computer to execute a method of controlling an image processing apparatus having a reading unit including first and second conveyance paths for conveying sheets and a scanner capable of changing a read position in order to read a sheet that passes through the first conveyance path and a sheet that passes through the second conveyance path respectively, and a printer engine, the method comprising:

obtaining image data by reading an image of a sheet by the reading unit;

printing an image on a sheet by the printer engine;

specifying a location of the sheet to which a predetermined image is to be attached;

conveying the sheet read by the reading unit to the printer engine and causing the predetermined image to be printed at the location of the sheet specified in the specifying; and causing the sheet on which the predetermined image has been printed by the printer engine to be conveyed to a read position of the reading unit and to be read, and transmitting image data obtained by reading the printed sheet to an external apparatus via the network and the printer engine prints the image data originated from a reading process by the reading unit for a copy of the printed sheet, wherein, in the causing, by causing the sheet on which the predetermined image has been printed in the printing to be conveyed through the first conveyance path of the reading unit and to pass through the second conveyance path, so that the scanner for which the read position is changed to read the sheet conveyed through the second conveyance path reads a front-surface of the sheet on which the predetermined image has been printed.

* * * * *